United States Patent Office 3,463,713
Patented Aug. 26, 1969

3,463,713
ELECTRODIALYSIS PROCESS USING INORGANIC
ION EXCHANGE MEMBRANES
Jacob I. Bregman, Glencoe, David E. Anthes, Chicago, and Robert S. Braman, South Holland, Ill., assignors, by mesne assignments, to the United States of America as represented by the Secretary of the Interior
No Drawing. Filed Dec. 13, 1966, Ser. No. 601,824
Int. Cl. B01d 13/02; B01k 1/00, 3/10
U.S. Cl. 204—180                                     4 Claims

ABSTRACT OF THE DISCLOSURE

Demineralization of solution by electrodialysis using a zirconium phosphate cation exchange membrane and a thorium oxide anion exchange membrane.

BACKGROND OF INVENTION

In the past few years a great amount of research has been conducted on the development of electrical membrane separatory processes. These processes take advantage of the difference in resistance to ion transport in a permselective membrane and in a bulk solution nonelectrolyte to either increase or deplete the ion concentration a portion of the bulk solution nonelectrolyte. A variety of uses have been found for these processes including, but not limited to, the recovery of salts from sea water, the removal of salts from molasses, recovery of spent acid solutions, demineralization of milk, recovery of pulping wastes, the lowering of citric acid levels in fruit juices and the purification of colloidal suspensions. By far the largest use of these processes has been the recovery of demineralized water from sea water or brackish water sources.

Scores of organic permselective membranes have been developed for this latter purpose.

Results at government sponsored demonstration units under controlled field conditions have shown that the single most important weakness in the demineralization of salt waters by electrical membrane processes has been the unreliability of the organic ion-exchange membranes. These membranes generally do not have reproducible properties, and they tend to break down or become fouled due to the presence of iron or detergents. Consequently, the cost of down-time and membrane replacement becomes excessive. Further, these membranes tend to be unstable to chemical attack and oxidation and their tendency to degrade increases with increasing temperature. This last deficiency is especially troublesome as the electrical membrane separatory processes have been found to proceed with much less resistance and greater efficiency at elevated temperatures.

Clearly, there is a need for membrane materials which will resist degradation and fouling, remain stable to chemical attack and oxidation and which will operate at elevated temperatures.

OBJECTS OF THIS INVENTION

The objects of this invention are to provide:

an improved electrodialysis process;
an improved transport depletion process;
an improved cation-exchange membrane;
an improved anion exchange membrane;
an improved method of making cation-exchange membranes; and
an improved method of making anion exchange membranes.

BRIEF SUMMARY OF INVENTION

Briefly, the present invention comprises a process for separating salts from salt bearing solutions using inorganic ion-exchange membranes. The membranes contemplated are a zirconium phosphate cation exchange membrane and a thorium oxide anion exchange membrane. These membranes are prepared by mixing the inorganic material with a solution containing an organic binder, casting the resulting mix and then curing.

DETAILED DESCRIPTION OF INVENTION
CATION MEMBRANE

Cation exchange membranes useful in the present invention include the products of reactions of acids derived from elements of Groups V or VI of the Periodic Table, such as, phosphoric acid, arsenic acid, tungstic acid, or molybdic acid with insoluble oxides such as those of the Group IV elements titanium, zirconium, hafnium, and thallium, or other elements such as iron, tin, chromium, aluminum, niobium, or tantalum. The most preferred material is zirconium phosphate.

Zirconium phosphate can be prepared by reacting zirconium salts, such as the nitrate, sulfate and chloride, with phosphoric acid. Two types of zirconium phosphate may be used in the present invention, the commercially available amorphous form, and crystalline zirconium biphosphate, in the hydrogen or sodium forms.

The crystalline biphosphate, $Zr(HPO_4)_2 \cdot H_2O$, may be formed by overnight digestion of the commercial amorphous materials in a 10 M phosphoric acid at a temperature of about 106° C. For the purposes of this disclosure the term zirconium phosphate is meant to include both these forms.

The method of preparing a cationic membrane whether from the amorphous or crystalline forms involves mixing the zirconium phosphate with a solution containing a solvent and a binder, spreading the resulting mixture on a smooth surface, to form a uniform layer of predetermined thickness, and then curing the membrane.

Several different binding agents may be used in the invention. Among these are Teflon (polytetrafluoroethylene), silicon based polymers, polyvinylbutyral, and polyvinylidene fluoride. The preferred binder is polyvinylidene fluoride because of its good stability and mechanical properties. Binders are most usually employed in the form of a solution. Solvents which may be employed include dimethyl-formamide, dimethylsulfoxide, mono- and di-alkyl ethers of ethylene glycol and dimethylacetamide. The concentration of binder in solvent is not critical although 10–30% binder has proven to be successful.

After the binder has been put into solution, zirconium phosphate in a size range of 10–400 mesh is added. Amounts of zirconium phosphate added may range from 2 to 20 times the amount of binder material. After the mixture has been achieved, it is spread with a doctor blade over a smooth surface such as a glass plate. It has been found advantageous to coat the glass plate with a thin layer of methylcellulose to act as a releasing agent. After the casting, the glass plates are placed in an oven at 90° to 110° C. from 30 minutes to overnight for the purpose of removing solvent. The plates are then placed in water to hydrate and detach the membranes from the casting plate.

Curing need not be accomplished by heat but may also be carried out by contacting the membranes with an aqueous phosphoric acid. This type of curing results in a membrane having a greater porosity and lower resistance than oven-cured membranes, but it also has lower transference numbers.

The final cation exchange membrane product consists of a thin uniform membrane consisting of from 50–95% zirconium phosphate and from 5–50% binder.

Anion membrane

The anion-exchange membranes of the present invention are formed of thorium hydrous oxide and a binder material. The same types of binders and solvents useful in the fabrication of zirconium phosphate cation membranes are also useful in the production of thorium oxide anionic membranes.

Three basic methods may be used to prepare the thorium oxide membranes. The first method involves forming hydrous thorium oxide in situ in the membrane by dissolving thorium nitrate in a binder-solvent solution, spreading the solution over a smooth surface with a doctor blade to form a membrane, and then curing it in an ammonium hydroxide solution. The hydrous oxide of thorium thus formed fills the pores of the membrane.

The second method is to mix dried powdered thorium oxide with the binder solution and to cast in the manner that the cation zirconium phosphate membranes were cast. To form the powdered thorium oxide, thorium hydroxide is pre-precipitated in one of two ways. In one method, gaseous ammonia is bubbled through a solution of thorium nitrate, followed by overnight digestion of the precipitate at 130 to 150° C. in an autoclave. This digestion increases the density of the hydrous oxide. Following digestion, the oxide is dried for about four days at about 130° C. and then ground. In another method, the oxide is prepared in the same manner with the exception that the precipitate was not autoclaved overnight.

The third general method of preparing the thorium oxide membrane is actually a variation of the first method and involves dissolving thorium nitrate in dimethylformamide and mixing with polyvinylidene fluoride. A dimethylformamide-water azeotrope is formed and is removed by heating at about 105° C. The resulting precipitate is then dissolved in polyvinylidene fluoride. The resulting mix is cast hot and the membranes formed are cured in an oven at about 110° C. Finally, the membrane is contacted with a 10% ammonium hydroxide solution.

The final membrane product regardless of the method of fabricating consists of a thin homogeneous mix of from about 50–95% thorium oxide and from about 5–50% binder.

Application of membranes to electrical separatory processes

Due to the ability of the instant membranes to remain stable at elevated temperatures, to resist degradation and fouling, and to remain stable to chemical attack and oxidation, as will be hereinafter more fully explained, they have great utility in electrical membrane separatory processes.

Among the most prominent of these processes are electrodialysis and transport depletion. These processes are well known in the art and have been previously used to demineralize saline waters.

Transport depletion is the most basic of the electrically driven processes. In that process demineralization depends upon the passage of ions through ion-exchange membranes in which these ions have transference numbers ($t^+$ or $t^-$) different from the transference numbers of such ions in solution. Concentration gradients are established at the faces of the membranes because different numbers of ions are involved in carrying electrical current through the membranes and through the solutions. The ion-selective membranes are all of one type (e.g., cationic anionic) within a transport depletion cell. A typical cellular configuration comprises a plurality of cationic membranes disposed between two electrodes. Depletion occurs on the anode side of each membrane and concentration on the cathode side.

Electrodialysis is a similar membrane process in which a driving force of electric current is used to move salt ions through solution. Advantage is taken of the selective qualities of both anionic and cationic membranes to separate the salts. A typical electrodialysis cell consists of alternate cationic and anionic membranes positioned between a pair of driving electrodes. When an electromotive force is applied, cations travel through the cation permeable membranes toward the cathode and anions travel through the anion permeable membranes toward the anode thereby forming alternate depleted and enriched zones.

The following examples are illustrative of the present invention:

Example 1

4.2 parts by weight of amorphous zirconium phosphate (−200, +240 mesh) is mixed well with about 4 parts by weight of dimethylformamide. To this mixture is then added 7 parts by weight of a 20% solution of polyvinylidenefluoride in dimethylacetamide and the resultant slurry stirred thoroughly to ensure homogeneous mixing. This mixture is then spread with a doctor blade onto a glass plate coated with a thin layer of methyl cellulose which acts as a releasing agent. The plate is placed in an oven to 90° C. to 100° C. for 2 to 3 hours to remove the solvent. At the end of the drying operation, the plate is immersed in aqueous 10% phosphoric acid solution for 1 hour in order to hydrate and detach the membrane from the glass plate and to condition the membrane. The membrane is then washed free of phosphoric acid and converted to $K^+$ form by equilibration in 1 M potassium chloride solution. The transference number of such a membrane for $K^+$ ion is found to be 0.91 to 0.94 in 0.05/0.1 M KCl solutions. Its electrical resistance is in the range of 8–10 ohms-cm.$^2$.

Example 2

A zirconium phosphate membrane is prepared in acordance with the procedure described in Example 1 by using crystalline zirconium biphosphate $Zr(HPO_4)_2 \cdot H_2O$. The crystalline compound is prepared by overnight digestion of the commercial amorphous material in a 10 M phosphoric acid at a temperature of about 106° C.

Example 3

10 parts by weight of thorium nitrate ($Th(NO_3)_4 \cdot 4H_2O$) is dissolved in 10 parts by weight of dimethylformamide. To this solution is added 15 parts by weight of a 20% solution of polyvinylidene fluoride in dimethylacetamide and the mixture is stirred vigorously to ensure homogeneous mixing. The resultant slurry is cast into a membrane by means of a doctor blade and equilibrated in aqueous 10% ammonium hydroxide solution to precipitate the hydrous oxide of thorium in the membrane pores. The membrane is washed free of ammonium hydroxide and equilibrated in 1 M potassium chloride solution. Membranes made in this way show transference numbers of 0.83–0.87 (in 0.05/0.10 M KCl) and resistances of 6–27 ohms-cm.$^2$.

Example 4

A heterogeneous anion exchange membrane was prepared in accordance with the procedure described in Example 1 by mixing previously precipitated and treated hydrous thorium oxide with the organic binder and casting. Thorium hydroxide was pre-precipitated in two ways.

In one method, gaseous ammonia was bubbled through a solution of thorium nitrate, followed by overnight digestion of the precipitate at 130 to 150° C. in a Parr 2-liter autoclave. After digestion, the product was filtered, dried for 4 days in an oven at 130° C. and ground to fine mesh. In the alternate method, the sample was prepared in the same way except that the precipitate was not autoclaved overnight. The anion exchange membranes prepared from the ground thorium hydrous oxide showed transference numbers of 0.83 and resistances greater than 200 ohm-cm.$^2$.

Example 5

10 parts by weight of thorium nitrate (Th(NO$_3$)$_4$·H$_2$O), was dissolved in 10 parts by weight of dimethylformamide (DMF), and the water-DMF azeotrope was removed by heating at 105° C. To this hot solution was then added 15 parts by weight of a 20% solution of polyvinylidenefluoride in dimethylacetamide and the mixture was stirred vigorously. The resultant slurry was then cast into membranes and cured in an oven at 110° C. for 2 hours. The membrane was then contacted with 10% ammonium hydroxide solution to convert the thorium to the hydroxide form. Transference numbers in the range of 0.89 to 0.92 and resistances of 1.0 to 6.0 ohms-cm.$^2$. were obtained for these membranes.

Example 6

Oxidation tests of membranes were carried out by equilibrating the membranes in KCl and treating them with chlorine (saturated) in 0.05 M KCl. This test is severe and is indicative of the maximum expected oxidation condition in actual operations. A zirconium phosphate cationic membrane and a commercial organic (polystyrene based) membrane were subject to this test. Electrical resistances of the membranes were measured at the beginning and at the end of one week exposure to chlorine. The zirconium phosphate membrane showed initial and final readings of 99 and 75 ohms-cm.$^2$ respectively whereas the organic membrane showed 11 and 94 ohms-cm.$^2$ respectively.

Example 7

Oxidation tests described in Example 6 were carried out on a thorium hydrous oxide anion exchange membrane and a commercial organic anion exchange membrane. The initial and final resistances of the inorganic membrane were 6 and 1 ohms-cm.$^2$ respectively, and those obtained for the organic anion exchanger membrane were 5 and 10 ohms-cm.$^2$. The inorganic membrane exhibited good physical stability whereas the organic anion membranes became brittle.

Example 8

The inorganic cation and anion exchange membranes described in Examples 1 through 5 were used in the multicompartment electrodialysis of sodium chloride brine. The electrodialysis cell consisted of six working pairs of membranes to give six diluting and six concentrating compartments in addition to two electrode compartments. The main feed solution was introduced by means of passageways of plastic spacers in two streams that fed alternate compartments, the diluting and the concentrating streams. The anode and cathode compartments were fed by separate streams. The effective flow area was 6 in.$^2$ per membrane. Platinum electrodes 6 in.$^2$ in area were used.

The operation of the inorganic electrodialysis cell is illustrated by carrying out the demineralization of sodium chloride solution (about 3000 p.p.m. of total dissolved solids) at 25° C. A series liquid flow system was used and the flow rate through the cell was adjusted to about 0.20 ml./sec. The electrical characteristics of the cell were obtained by measuring current and voltage. Pertinent cell performance data were evaluated at the point of limiting current density and these are presented in Table 1.

TABLE 1.—ELECTRODIALYSIS OF SODIUM CHLORIDE
Membranes: Thorium hydrous oxide and zirconium phosphate membranes
Stack Dimensions: 6 cell pairs, 13 membranes
Flow Area: 6 sq. in. membrane

| Conditions | Values | |
|---|---|---|
| | 25° C. | 60° C. |
| Voltage, v | 11.1 | 8.8 |
| Current, amp | 0.122 | 0.140 |
| Resistance, ohms: | | |
|   Cell | 90.0 | 62.5 |
|   Dilute effluent | 50.0 | 64.0 |
|   Concentrated effluent | 15.0 | 15.3 |
|   Feed solution | 23.2 | 24.5 |
| Flow Rate, ml./sec.: | | |
|   Dilute effluent | 0.20 | 0.24 |
|   Concentrated effluent | 0.21 | 0.28 |
| Total dissolved solids, p.p.m.: | | |
|   Dilute effluent | 1,317 | 1,030 |
|   Concentrated effluent | 4,700 | 4,420 |
|   Feed solution | 3,010 | 2,925 |
| pH: | | |
|   Dilute effluent | 4.5 | 4.3 |
|   Concentrated effluent | 3.1 | 3.1 |
|   Feed solution | 4.5 | 4.7 |
| Salt exchange, percent: | | |
|   Dilute effluent (removed) | 50.0 | 65.0 |
|   Concentrated effluent (added) | 56.5 | 51.5 |
| Current efficiency, percent: | | |
|   Diluting cells | 88.5 | 89.6 |
|   Concentrated cells | 80.5 | 83.0 |

Example 9

The high temperature performance of the inorganic membrane unit was tested by carrying out electrodialysis experiments on sodium chloride solution (3000 p.p.m.) at 60° C. Cell performance data were obtained at the point of limiting current density and are presented in Table 1 along with those obtained at 25°.

A comparison of the results of the inorganic membrane unit at 25 and 60° C. showed that operation at 60° C. resulted in a 31% decrease in the overall stack resistance and a 30% increase in the salt removal with a lower power input. The current efficiency was satisfactory and was not greatly affected by temperature.

While the above examples are illustrative of the membranes and processes of the present invention, they are not to be interpreted as limiting. It will be apparent to those skilled in the art that various adaptations and modifications of the invention as described herein are possible without departing from the spirit and scope of the invention.

What is claimed is:
1. In a process for demineralizing solutions by transport depletion through a cation exchange membrane, the improvement comprising utilizing as said cation exchange membrane a material consisting of from about 50–95% zirconium phosphate and from about 5–50% of a binder selected from the group consisting of polyvinylbutyral and polyvinylidene fluoride.
2. In a process for demineralizing solutions by transport depletion through an anion exchange membrane, the improvement comprising utilizing as said anionic exchange membrane, a material consisting of from about 50–95% thorium oxide and from about 5–50% of a binder selected from the group consisting of polytetrafluorethylene, polyvinylbutyral and polyvinylidene fluoride.
3. In a process for demineralizing solutions by electrodialysis through alternating cation exchange and anion exchange membranes, the improvement comprising utilizing as said cation exchange membrane a material consisting of from about 50–95% zirconium phosphate and from about 5–50% of a binder selected from the group consisting of polyvinylbutyral and polyvinylidene fluoride.
4. The process of claim 3 wherein said anion exchange membranes consist of from about 50–95% thorium oxide and from about 5-50% of a binder selected from the group consisting of polytetrafluoroethylene, polyvinylbutyral, and polyvinylidene fluoride.

References Cited

UNITED STATES PATENTS

| | | | |
|---|---|---|---|
| 2,827,426 | 3/1958 | Bodamer | 204—98 |
| 3,056,647 | 10/1962 | Amphlett | 23—14.5 |
| 3,276,910 | 10/1966 | Grasseli et al. | 136—86 |
| 3,346,422 | 10/1967 | Berger | 136—148 |

OTHER REFERENCES

Hamlen, "Ionic Conductivity of Zirconium Phosphate," Jnl. Electrochem. Soc., August 1962, pp. 746–749.

JOHN H. MACK, Primary Examiner

A. C. PRESCOTT, Assistant Examiner

U.S. Cl. X.R.

136—153; 204—295, 301